April 22, 1924.
P. G. LUBER
RECEPTACLE
Filed March 30, 1923
1,491,105
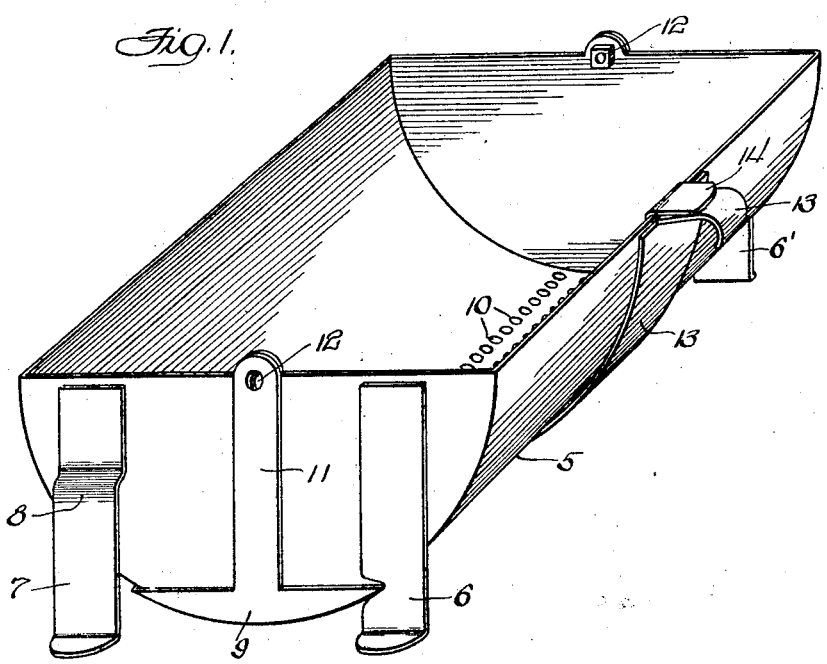
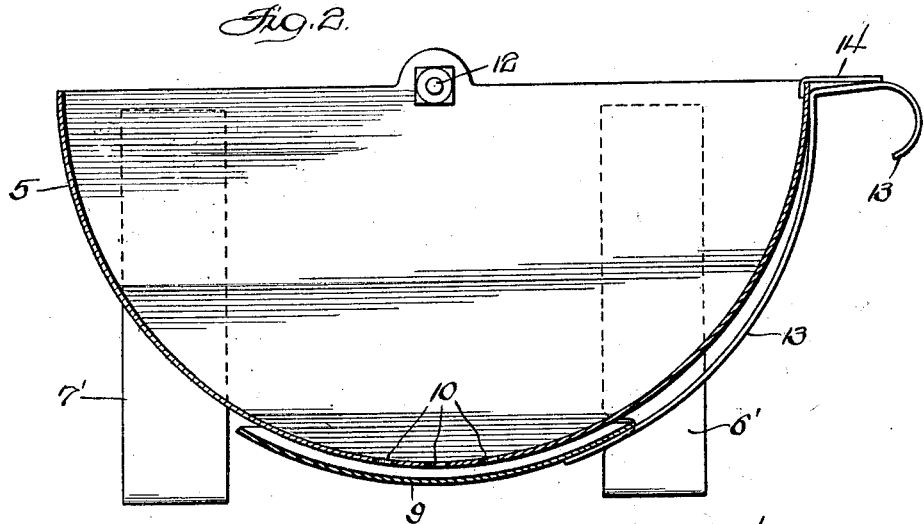
Inventor:
Philip G. Luber Patented Apr. 22, 1924.

1,491,105

UNITED STATES PATENT OFFICE.

PHILIP G. LUBER, OF CHICAGO, ILLINOIS.

RECEPTACLE.

Application filed March 30, 1923. Serial No. 628,943.

*To all whom it may concern:*

Be it known that I, PHILIP G. LUBER, a citizen of the United States, residing at Chicago, in the county of Cook and State of Illinois, have invented certain new and useful Improvements in Receptacles, of which the following is a specification.

The invention relates to an improved draining receptacle or vessel.

It will be described with respect to its use as a culinary utensil, to be placed in kitchen sinks to receive waste bits of material charged, more or less, with water or other liquid, which drains into the sink, the solid matter being retained in the receptacle until emptied into another, larger receptacle such, for example, as a garbage pail or can.

One of the objects of the invention is to provide a draining receptacle, or vessel, to strain out the liquid content of the material placed therein, and the provision of a tray to be moved under the straining openings, in the perforated bottom of the vessel, to hold and retain the drip to prevent it from dropping on the floor when the receptacle is being carried from the sink to a larger receptacle, or can.

A further object is to provide a tray which is conveniently movable into receiving position under the perforated bottom of the receptacle by a handle which cooperates with a handle on the receptacle by which both members are carried.

Other and more specific objects and advantages of my invention will readily appear from a consideration of the following description taken in conjunction with the drawings, wherein:—

Fig. 1 is a perspective view of one form which the invention may take.

Fig. 2 is an enlarged central transverse section.

In both views the same reference characters indicate corresponding parts.

The body of the vessel 5, as shown in the drawings, is semi-cylindrical trough-like in form closed at both of its ends. It is supported on two pairs of legs 6 and 6′, and 7—7′. The legs 7—7′ are set out from the ends of the vessel, as at 8, to permit movement of the tray 9 thereunder.

The vessel is perforated by a plurality of longitudinally extending rows of holes 10, to permit the liquid content to drip therefrom. The imperforate tray 9 is in form similar to the vessel 5 but is not so deep, being parti-cylindrical, closed at both ends, and is designed, when in the position shown, to catch and hold the liquid that drains out of the vessel. The tray has an upwardly-extending arm 11, at each end, pivoted to the vessel at 12, so that it may be circumferentially moved, under the offset legs 7—7′ from under the perforated portion of the vessel to one side, by depressing the handle 13, which extends from one side of the tray and which is in frictional contact therewith so that the tray will remain in the position in which it has been placed. The tray will hold a small quantity of the liquid which drains from the vessel.

The vessel has a laterally extending handle 14 in the same vertical plane with the handle 13. When the device is carried from the sink to be emptied, these handles are brought together and both are grasped by thumb and finger. At this time the tray is under the perforations. When the device is returned to the sink the handle 13 is depressed thereby moving the tray to one side from under the perforations 10, permitting the vessel to drain directly into the sink.

There may be many uses for the device besides that described and some variation within the scope of the invention may be made without departure from the spirit of the invention.

Having described my invention what I claim as new and desire to secure by Letters Patent, is:—

1. A trough-like parti-cylindrical elongated drain vessel having a curved perforated bottom and closing end walls, and an elongated trough-like parti-cylindrical tray, having a concentric curved imperforated spaced bottom wall and closing end walls extending beyond the ends of the drain vessel, the end walls at each end of the structure hinged together near the upper edges of the drain vessel.

2. A semi-cylindrical trough-like drain vessel having perforations near the bottom thereof; an imperforate tray pivoted to the vessel at the upper edge of the vessel and curved concentrically with the vessel; a handle extending from one side of the vessel and a handle extending from the corresponding side of the tray and under the vessel handle, said handles being near each other when the tray is below the perforations.

3. A semi-cylindrical trough-like drain vessel having perforations near the bottom portion thereof; legs for supporting the vessel; a tray, curved from substantially the same point as the vessel, located below the vessel and having arms at its ends extending upwardly, pivoted to the upper edge of the vessel, a handle extending from one side of the vessel, and a handle extending from the same side to the tray, in substantially the same vertical plane, and having frictional contact with the outer surface of the vessel to hold the tray in position.

In testimony whereof I hereunto subscribe my name.

PHILIP G. LUBER.